Patented Apr. 20, 1948

2,439,824

UNITED STATES PATENT OFFICE 2,439,824

RESIN FROM PHENOL, FORMALDEHYDE, SATURATED AND UNSATURATED HYDROCARBONS, AND ROSIN

Fritz Rostler and Leopold Bornstein, Wilmington, Del., assignors to Wilmington Chemical Corporation, Wilmington, Del., a corporation of Delaware No Drawing. Application February 3, 1941, Serial No. 377,268. In Germany May 30, 1938

2 Claims. (Cl. 260—25)

This invention relates to improvements in the synthetic resin compositions disclosed in U. S. Patent No. 2,247,411 and in the method of making such compositions.

It has been noted that saturated petroleum hydrocarbons are generally not compatible with synthetic resins and lacquers and in some instances if excessive amounts are carried into the condensation product, this results in cloudiness in the resin or a separation of the oils. This effect may or may not be undesirable depending upon the use to which the material may be put. Inasmuch as the amount of tolerance may vary, it is desirable to increase it to a point where cloudiness may be avoided even if relatively large amounts of the saturates are present in the condensation product.

We have established, for example, that the unsaturated hydrocarbon products obtained from waste products of mineral oil refining as described in said patent contain or may contain saturated hydrocarbons in variable proportions and that the presence of such saturated hydrocarbons in the unsaturated hydrocarbon material incorporated into the resin compositions according to said patent may produce undesirable results such as a cloudy appearance or oily surface of the synthetic resin products. An object of the present invention is to overcome this difficulty.

We have also established that these difficulties can be completely eliminated or avoided by observing certain precautions. These precautions are based on our discovery that condensates containing the unsaturated hydrocarbons previously described, and varnishes or other solutons made therefrom, can only tolerate the presence of certain rather definite amounts of saturated unreactive hydrocarbons; and that the limit of this tolerance or compatibility is dependent upon (1) the nature of the other constituents of the condensate; and (2) the amount of the unsaturated hydrocarbon material described hereinabove, which is present. This tolerance can also be modified (that is, increased) to some extent by the presence of certain other materials in the condensates or varnishes made therefrom, as described more fully hereinbelow.

In more detail, we have now found that the essentially unsaturated hydrocarbon material which is incorporated in condensation products, etc., as described in said patent, and is obtained from waste products of mineral oil refining, consists essentially of three parts; and we have further found that these three parts have different reactivities, especially in condensation reactions. These three parts may be designated (1) the first soluble fraction, (2) the second soluble fraction, and (3) the insoluble fraction. Of these, the first soluble fraction is soluble in ordinary concentrated sulfuric acid (e. g., 98 per cent). The second soluble fraction is not soluble in concentrated sulfuric acid, but is soluble in fuming sulfuric acid (e. g., containing 20 to 30 per cent excess $SO_3$). The third or insoluble fraction is not soluble in either concentrated or fuming sulfuric acid. It is often a saturated oily unreactive hydrocarbon material which is generally similar to the "white oil" sometimes produced from petroleum for medicinal and other purposes.

The proportions in which these three constituents are present in hydrocarbon materials obtained from petroleum waste products have a very definite effect on the applicability of such materials in the synthetic resin arts. Fortunately, it is generally possible to select or prepare fractions of the hydrocarbon mixtures having the desired proportions of the three constituents; and it is always possible to determine these proportions without difficulty. This determination is made by treating the hydrocarbon mixture obtained from acid sludge or solvent extract residue with sulfuric acid of about 98 per cent concentration. This precipitates the first soluble fraction; that is, the acid dissolves the soluble fraction and the solution separates from the undissolved hydrocarbons. The remaining part of the original material is separated from the solution and then treated with fuming sulfuric acid containing from 20 to 30 per cent of $SO_3$. This precipitates the second soluble fraction, usually as a solution, which is removed. The remaining part of the original material is the saturated unreactive material known as the insoluble fraction, which ordinarily consists of white oil, or solid paraffin, or both. The saturated hydrocarbon material in this insoluble fraction is, for most purposes, an impurity in the unsaturated material of the first and second soluble fractions.

However, it causes no difficulty if its ratio to the other fractions is not too high.

We have found that the proportions of the three stated constituents in the hydrocarbon materials obtained from petroleum waste products vary considerably. In a typical hydrocarbon mixture obtained from acid sludge, there was 80 per cent of the first soluble fraction, 10 per cent of the second soluble fraction, and 10 per cent of white oil (the insoluble fraction). Another hydrocarbon mixture, obtained from solvent extract residue, contained 50 per cent of the first soluble fraction, 40 per cent of the second soluble fraction, and 10 per cent of white oil. It should be understood that these are merely typical proportions, and that the actual proportions may vary widely in individual cases. For example, the insoluble fraction may constitute 30 per cent or more of the total hydrocarbon mixture as recovered from petroleum waste products, unless care is taken to minimize it, in which case it may be only 5 per cent or less.

The determination of the composition of the hydrocarbon mixture in terms of these three constituents is often desirable in that it gives considerable additional information as to the character of the materials present. For example, both of the mixtures previously mentioned (obtained from acid sludge and from solvent extract residues, respectively) had iodine numbers of 42 and were generally similar in appearance. However, the first soluble fraction of the product obtained from acid sludge (amounting to 80 per cent of the total, as noted) had an iodine number of 52, as compared with an iodine number of 72 for the first soluble fraction (50 per cent) of the material obtained from solvent extract residue. The second soluble fractions had iodine numbers of 15 and 12, respectively, while the iodine number of the white oil was, in both cases, zero.

The amount of white oil which can be tolerated in phenolic condensation products containing these hydrocarbons depends partially, as previously noted, on the type of phenol which is used. This is shown by a series of tests in which a standard formula was employed, varying only the type of phenol, with several different amounts of white oil present. In these tests, the following formula was used:

A phenol (as listed below) _____ grams__ 100
Formaldehyde (40 per cent solution) __do____ 80
Unsaturated hydrocarbons as described above _____ grams__ 25
Ammonia (28 per cent solution) _____ cc__ 6

In preparing the resins, the hydrocarbons were dissolved in the phenol, the formaldehyde was added, and then the ammonia was added. The mixture was refluxed for 40 minutes with good agitation, and then the water and the uncondensed formaldehyde were distilled off under vacuum, until a sample would break in water at 20° C. The resins were tested for clarity by applying a sample to a glass plate, hardening by heating in an oven at 180° C. for 30 minutes, and observing the resulting film. In a parallel series of tests, the same formula was used, except that 50 parts of the unsaturated hydrocarbons were used instead of the 25 parts (per 100 parts of phenol) in the formula previously stated. The following phenols were used in these tests:

(1) A "commercial cresol for synthetic resin" containing 40 per cent metacresol and a very small amount of orthocresol.

(2) A "commercial cresylic acid" having a boiling range of 190 to 220° C.

(3) A "commercial cresylic acid" having a higher boiling range of 200 to 240° C.

(4) Xylenol.

(5) A mixture of 75 parts high boiling cresylic acid and 25 parts cresol produced from petroleum sources.

With each phenol, hydrocarbon mixtures containing various amounts of white oil (insoluble fraction) were used, in order to determine the maximum tolerance for white oil of each phenolic condensation product containing 25 or 50 parts of the unsaturated hydrocarbon mixture per 100 parts of phenol. With the first of the phenols (from the above list) it was found that a clear resin was obtained only when the hydrocarbons contained a total of 96 per cent of first and second soluble portions—that is, no more than 4 per cent of white oil. With the second phenol, the tolerance for white oil (with 25 to 50 parts of hydrocarbons present per 100 parts of phenol) was 7 per cent of the total hydrocarbons. The results of these tests may be tabulated as follows (the percentage in each case being the maximum permissible percentage of white oil in the 25 to 50 parts of hydrocarbons employed with each 100 parts of the various phenols, which would permit the attainment of a clear resin film under the described test conditions):

| Phenol No. | Permissible Percentage of White Oil in Hydrocarbons |
|---|---|
| 1 | 4 |
| 2 | 7 |
| 3 | 10 |
| 4 | 16 |
| 5 | 20 |

It should be noted that the values obtained in these tests relate to hydrocarbon mixtures in which the insoluble portion is white oil. The tolerance for solid paraffin is much less than the tolerance for white oil.

These figures indicate the influence of the particular phenol employed on the compatibility of (or tolerance for) white oil in phenol-aldehyde condensation products containing a substantial proportion of the unsaturated hydrocarbons employed in accordance with this invention. When these unsaturated hydrocarbons are omitted, the permissible amount of white oil falls substantially to zero.

In the foregoing series of tests, a comparison of the results obtained with phenol No. 3 and phenol No. 5 shows that the tolerance for white oil in these phenolic condensation products can be increased substantially by adding certain ingredients to the condensation mixture. In this specific instance, the added ingredient was a cresol of petroleum origin, which is compatible with white oil, and also with the other resin constituents. In addition to this petroleum cresol, other compounds having these characteristics (compatibility with white oil and also with cresol and other resin constituents) may be employed to increase the tolerance of condensates for white oil. Suitable materials of this nature include para-tertiary amyl phenol (also known as amylophenol) and ordinary rosin, which apparently serve in some way as a link between the resin constituents and the usually incompatible white oil. Similar results are also obtained with tricresyl phosphate, although it is much less soluble in white oil than the other compounds mentioned. The effectiveness of addition agents of this type is illustrated by tests in which 100 parts of commercial cresol containing 40 per cent of metacresol, 80 parts of formaldehyde (40 per cent solution), 6 parts of ammonia (28 per cent solution), and 25 parts of the unsaturated hydrocarbons containing 20 per cent of white oil were condensed in the manner previously described. As shown hereinabove, the "normal" tolerance for white oil of a resin made from this phenol is only 4 per cent, on the added hydrocarbons. However, it was found possible to make a clear transparent resin from this formula when employing hydrocarbons containing 20 per cent of white oil by adding one of (a) 0.5 to 2 per cent tricresyl phosphate;
(b) 1.5 to 3 per cent para tertiary amyl phenol; or
(c) 5 to 10 per cent rosin.

These materials are therefore more effective per unit of weight in making white oil compatible with condensation products than the petroleum cresol used in test No. 5, hereinabove.

The tests described hereinabove, and others of like nature, have established that the compatibility of saturated hydrocarbons or white oil with phenolic condensation products depends on the kind of phenol used, and may be modified to some extent by the addition of certain agents which are compatible with white oil or with the phenols or with both. It has also been determined that the tolerance for white oils depends largely on the amount of the unsaturated hydrocarbons incorporated in the condensation products in accordance with this invention. In one demonstration of this, the following tests were made:

250 grams of a commercial cresol for synthetic resin containing 40 per cent of metacresol;
200 grams of formaldehyde, 40 per cent solution; and
15 cc. of ammonia (28 per cent solution)

were condensed by heating under reflux, and water and excess formaldehyde were distilled off until a sample broke in water at 20° C. The resulting condensation product was mixed with 270 grams methylhexaline (methylcyclohexanol) and the mixture was boiled for one hour to dissolve all of the resin particles. Thirty grams of tung oil dissolved in 135 grams methylhexaline were added to the boiled solution, and the mixture was boiled under reflux at 110 to 130° C. with agitation for about 2½ hours. At this time, a clear transparent lacquer base of medium consistencey had been prepared, and it was found that this hardened at 180° C. to an entirely clear film.

This lacquer base was mixed with different amounts of white oil and different amounts of a synthetic mixture of acid soluble (first and second) fractions of the described hydrocarbons. The white oil used was commercial mineral oil having a molecular weight of about 360. Samples represent various proportions of white oil and acid soluble unsaturated hydrocarbons were hardened at 180° C. By the results of this test, it is shown that the tolerance for white oil of this cresol-formaldehyde lacquer is very low, but is substantially increased by increasing the amount of the unsaturated hydrocarbons present in accordance with this invention. The results in a typical series of tests are tabulated herewith, in terms of the maximum percentage (or parts) of white oil which can be tolerated in 100 parts of the above-described lacquer base after adding varying amounts of acid soluble Naftolen hydrocarbons.

| Hydrocarbons (Acid Soluble); Parts per 100 parts Lacquer Base | White Oil; Maximum Parts Tolerated per 100 parts Lacquer Base |
|---|---|
| 0 | 1.5 |
| 20 | 4 |
| 40 | 13 |
| 60 | 23 |
| 70 | 30 |
| 80 | 34 |

These results are, of course, specific to the lacquer base made with the stated cresol. As would be expected from the results previously described, the absolute values of the amount of white oil tolerated, in proportion to the amount of unsaturated acid-soluble hydrocarbons present, varies when different phenols are employed. For example, by replacing one-half of this particular cresol with high-boiling cresylic acid, the tolerance for white oil (for a given amount of unsaturated hydrocarbons) is increased about 30 per cent over a substantial portion of the range covered.

As shown, the above-mentioned lacquer base tolerates the presence of only about 1.5 per cent of white oil in the absence of the previously described unsaturated hydrocarbons. This same base tolerates only about 1 per cent of solid paraffin having a molecular weight of about 330. The amount of paraffin tolerated by these lacquers and condensation products is always less than the amount of white oil tolerated. For example, a lacquer base which can tolerate 30 per cent white oil in the presence of 100 parts of the unsaturated hydrocarbons can tolerate only 13 per cent of paraffin and 9 parts of white oil under similar circumstances. The tolerance also differs somewhat for different kinds of white oils. For example, 35 per cent of Russian white oil can sometimes be tolerated in compositions which are made cloudy (in hardened films) by the presence of 30 per cent of American white oil.

We have thus found that improved plastic compositions, and particularly compositions of the phenol-aldehyde type, can be prepared by incorporating in these compositions substantial percentages of an essentially unsaturated hydrocarbon material containing about 90 per cent carbon and 10 per cent hydrogen, which is derived from the waste products of mineral oil refining. We have also found that uniformly satisfactory results can be obtained from such compositions by observing certain precautions involving the amount of saturated hydrocarbons, such as white oil and paraffin, which are incorporated into the condensation products in association with the said unsaturated hydrocarbons. More specifically, we have found that the amount of saturated oils which can be tolerated in phenolic condensation products without causing cloudiness, oil separation, etc., depends (1) on the kind of phenol employed, and (2) on the amount of the said unsaturated hydrocarbons present and (3) on the presence of additional materials which are compatible with the phenols and the white oils or saturated hydrocarbons. Stated differently, our invention thus comprises a method of incorporating in plastic compositions (and especially those containing phenol-aldehyde condensation products) saturated hydrocarbon materials not normally compatible with such condensation products; this being effected without detriment to the properties of the condensation products, and generally resulting in products having improved properties.

Further examples of condensation products and their production within the scope of this invention are as follows:

Example A

| | Parts |
|---|---|
| Cresylic acid with a boiling range of 199 to 225° C. | 100 |
| The above-described unsaturated hydrocarbons containing 8% white oil | 25 |
| Formaldehyde (40% solution) | 95 |
| Ammonia (28% solution) | 5 |

These ingredients were condensed, and the uncondensed parts (e. g., water and excess formaldehyde) were distilled off in the usual manner. After reaching the stage at which the resin sample became brittle if tested in water at 20° C., the melted resin in the kettle was dissolved in 60 parts of solvent mixture composed of 40 parts of toluene and 40 parts of ethyl alcohol. An excellent laminating varnish was thus obtained.

Example B

| | Parts |
|---|---|
| Cresol with 40% meta-cresol | 100 |
| Formaldehyde (40% solution) | 90 |
| The unsaturated hydrocarbons containing 8–16 parts of white oil | 20–50 |
| Ammonia (28% solution) | 10 | were condensed, and the uncondensed parts were distilled off in the usual manner. After the resin samples tested in water showed the characteristic brittleness, 50 parts of methyl cyclohexanol were added and the resin solution was heated under reflux at about 120° C. for a few hours until a sample showed the viscosity of a very heavy honey. The resulting liquid resin was further diluted with 60 parts of a mixture composed of 30 parts toluene and 30 parts alcohol. This product is well adapted for use in laminating operations, has a short curing time, and shows excellent electrical properties. Slight cloudiness, etc., is sometimes encountered when using hydrocarbons containing the larger amounts of white oil; and if this is objectionable, it is readily overcome by including in the condensation mixture one of the compatible modifying agents mentioned hereinabove, such as para tertiary amyl phenol or rosin.

Example C

| | Parts |
|---|---|
| Cresylic acid with a boiling range of 180 to 210° C. | 75 |
| Cresylic acid made from petroleum sources | 25 |
| Formaldehyde (40% solution) | 90 |
| Ammonia (28% solution) | 8 |
| The above-described unsaturated hydrocarbons with 16 parts of white oil | 25 |

These ingredients were condensed and distilled in the described manner, and diluted with 80 per cent of a mixture containing 40 parts of toluene and 40 parts of alcohol to make an excellent laminating varnish. Before diluting with the solvent mixture, there is obtained a resin which is well adapted for lacquer purposes.

Example D

| | Parts by weight |
|---|---|
| Cresylic acid from petroleum sources | 100 |
| Formaldehyde (40% solution) | 80 |
| The above-described unsaturated hydrocarbons with 0–20% of white oil | 25–50 |
| Ammonia (28% solution) | 6 |

These ingredients, when condensed and distilled in the usual manner, yielded a clear, hard thermoplastic (not thermo-setting) resin useful in varnishes. It was easily soluble in drying oils, including China-wood oil and linseed oil.

Example E

| | Parts by weight |
|---|---|
| High boiling xylenol | 100 |
| The above-described unsaturated hydrocarbons containing 8–16% of white oil | 25–50 |
| Formaldehyde (40% solution) | 100 |

These ingredients were condensed without any accelerator, and distilled in the normal manner. The resulting liquid, thermo-setting resin was used to impregnate fabrics and asbestos, then hardened by heating or molding to produce articles having excellent chemical resistance.

The unsaturated hydrocarbon materials used in the foregoing examples were produced from acid sludge and from the residues of solvent extract refining of mineral lubricating oils. In order to reduce the white oil content of these hydrocarbons to the desired range, the acid sludge used as a starting material in some cases was centrifuged prior to processing in accordance with the procedures previously mentioned. The hydrocarbons derived from solvent extracts were selected from fractions having the desired contents of first and second acid soluble portions. In selecting these fractions, it is merely necessary to fractionate a sample of an unsaturated hydrocarbon mixture produced as described heretofore, and to test the fractions to ascertain their contents of first and second soluble portions and insoluble portions. With this information, the main body of the hydrocarbon mixture is fractionated to obtain products having the desired composition.

It should be understood that our invention is not limited to the foregoing examples, but may be variously practiced and embodied within the scope of the appended claims.

What we claim is:

1. Method for the production of heat-hardenable synthetic resin compositions of the phenol-aldehyde type containing saturated hydrocarbons in an amount sufficient to cause cloudiness when hardened, said resin having the characteristic of being substantially free from cloudiness when hardened, comprising effecting condensation of a mixture containing formaldehyde, a phenol condensible therewith to form a heat-hardenable resin, unsaturated hydrocarbons capable of condensing therewith, a proportion of more than 4% of saturated hydrocarbons boiling in the range of 160° to 360° C. at 12 mm. Hg, and sufficient to cause substantial cloudiness when said resin is hardened, and rosin, the amount of rosin being less than 10%, said unsaturated hydrocarbons being derived from by-products of mineral oil refining of the class consisting of those obtained by neutralizing petroleum acid sludge and fractionating the organic constituents thereof under vacuum to eliminate at least the portions boiling outside the range from 160° to 360° C. at 12 mm. Hg, and those obtained as solvent extract residues in the selective solvent refining of mineral oils, said unsaturated hydrocarbons having a composition of approximately 90% carbon and 10% hydrogen.

2. A heat-hardenable synthetic resin composition of the phenol-aldehyde type containing saturated hydrocarbons in an amount sufficient to cause cloudiness when hardened, said resin having the characteristic of being substantially free from cloudiness when hardened, comprising a heat-hardenable condensate of a mixture of a phenol, said phenol being condensable with formaldehyde to form a heat-hardenable resin, formaldehyde and unsaturated hydrocarbon and a proportion of more than 4% of saturated hydrocarbons boiling in the range of 160° to 360° C. at 12 mm. Hg, said proportion of said saturated hydrocarbons being sufficient to cause substantial cloudiness in the said resin when hardened, and rosin, the amount of rosin being less than 10%, said unsaturated hydrocarbons being derived from by-products of mineral oil refining of the class consisting of those obtained by neutralizing petroleum acid sludge and fractionating the organic constituents thereof under vacuum to eliminate at least the portions boiling outside the range from 160° to 360° C. at 12 mm. Hg, and those obtained as solvent extract residues in the selective solvent refining of mineral oils, said unsaturated hydrocarbons having a composition of approximately 90% carbon and 10% hydrogen.

FRITZ ROSTLER.
LEOPOLD BORNSTEIN.

REFERENCES CITED

The following references are of record in the file of this patent:

UNITED STATES PATENTS

| Number | Name | Date |
|---|---|---|
| 2,114,121 | Bender | Apr. 12, 1938 |
| 1,996,069 | Honel | Apr. 2, 1935 |
| 1,425,784 | McCoy | Aug. 15, 1922 |
| 1,945,719 | Apgar | Feb. 6, 1934 |
| 2,163,637 | Thomas | June 27, 1939 |
| 2,079,633 | Rothrock | May 11, 1937 |
| 2,247,411 | Rostler et al. | July 1, 1941 |
| 2,122,543 | Tomsicek | July 5, 1938 |
| 1,996,070 | Honel | Apr. 2, 1935 |
| 2,062,676 | Reiff | Dec. 1, 1936 |
| 2,317,372 | Gessler | Apr. 27, 1943 |
| 1,191,390 | Berend | July 18, 1916 |